Patented June 12, 1951

2,556,336

UNITED STATES PATENT OFFICE 2,556,336

COPOLYMERIZATION OF STYRENE WITH BLOWN UNSATURATED FATTY OILS

Roland W. Nye, Springfield, N. J., assignor, by mesne assignments, to Harvel Research Corporation, a corporation of New Jersey No Drawing. Application August 20, 1946, Serial No. 691,868

7 Claims. (Cl. 260—23)

This invention relates to novel compositions of matter and to novel methods and steps in said methods for producing them. In one of its more specific aspects this invention relates to novel compositions of matter produced with blown oils and styrene and to methods for preparing them.

Briefly, this invention is directed to the various compositions which may be produced with blown oils and monomeric styrene. In one of its specific aspects blown oils may be mixed with monomeric styrene and this mixture may be heated to convert the same to a wide range of compositions, varying from a viscous liquid to a hard solid resinous mass. In another and a preferred aspect of this invention a mixture of a blown oil and monomeric styrene dissolved in a suitable hydrocarbon solvent may be heated to provide a composition, apparently a copolymer, which may be thrown out of solution by the addition thereto of a non-solvent therefor capable of dissolving the residual blown oil and monomeric styrene. The precipitate or copolymer is separated from the remainder of the mass, then is washed free of monomeric styrene and can be employed as a coating or surfacing material capable of air drying when in thin films. These dry films have good adhesion to metal characteristics and may be creased sharply without rupturing. While this copolymer or combination of heat produced blown oil-styrene combination may be used in its present state, it is preferable that it be dissolved in monomeric styrene and this solution is heated until its viscosity has increased and to provide a thermosetting composition which is clear and has good electrical insulation characteristics.

In the practice of this invention the blown oils employed are the blown unsaturated oils of vegetable, marine or animal origin, such as linseed oil, sardine oil, menhaden oil, soya-bean oil, etc. all of which are, of course, fatty oils. The viscosity of said blown oils at 25° C. may be in the range of 10 to 300 poises (Gardner method) and preferably 20 to 80 poises (Gardner method). These blown oils are readily available on the market and are generally produced by heating and vigorously blowing the unsaturated oil with air until its viscosity has increased to the desired value.

In one of the specific aspects of this invention one or a combination of two or more of said blown unsaturated oils is mixed with monomeric styrene. The blown oil at 25° C. has a viscosity of 10–300 poises and preferably 20–80 poises (Gardner method). This combination is vigorously agitated until a substantially uniform and homogeneous composition is produced. The ratio by weight of the quantity of blown oil to the quantity of monomeric styrene in said combination is at least 100 to 50 and generally may vary in the ratio of 100 to 50 to 100 to 300. Said homogeneous composition may then be heated in a covered dish at an elevated temperature in the range of 105° C. to 140° C. or higher and maintained at said elevated temperature until the viscosity of the mass has increased to at least 27 poises (Gardner method). In the course of this heating step there is produced a combination of the blown oil and styrene which appears to be of a copolymeric nature. The mass may be heated to produce a liquid or a solid mass depending upon the time of heating which may vary preferably between about 1–3 hours. When the heating is stopped before solidification and the viscosity of the mass has increased to about 120 poises (Gardner method) there is provided a solution of the blown oil-styrene combination in monomeric styrene. This liquid mass may then be maintained at a temperature of 100° C.–300° C. in an open dish to evaporate off the monomeric styrene solvent leaving behind the blown oil-styrene combination. This combination may be either a liquid or a solid at the baking temperature depending upon the amount of styrene which had combined with the blown oil. These blown oil-styrene combinations vary in property from that of a viscous oil to a hard resinous mass. These products may be fusible thermosetting or thermoplastic resinous compositions depending upon the time of heating and the ratio of blown oil to styrene in the original mix.

In another aspect of this invention 100 parts by weight of a blown oil whose viscosity at 25° C. is in the range of 10–300 and preferably 20–80 poises (Gardner method) and at least 50 parts by weight of monomeric styrene are dissolved in a suitable solvent, such as a hydrocarbon solvent, examples of which are heptane, V. M. P. naphtha, mineral spirits, etc. The quantity of monomeric styrene in said solution may be in the range of 50–300 parts by weight although the upper limit may be considerably above 300 if desired. However, 300 is the more practical upper limit so that there is maintained within reasonable limits the quantity of styrene which is to be recovered later in the process. The ratio of the quantity of said solvent by weight to the sum of the quantities of said blown oil and monomeric styrene by weight is in the range of 5–100 to 100–100 and preferably 25–100 to 60–100. The solution of blown oil and monomeric styrene in the solvent may be heated for a period of ¼ to 3 hours to produce a blown oil-styrene combination dissolved in said solvent. Then to said solution which may be cooled to room temperature is added a precipitant capable of throwing the blown oil-styrene combination out of solution. For this purpose the lower aliphatic alcohols, such as methanol and ethanol, may be used. The ratio of precipitant by weight to the solution by weight may vary over a considerable range, but for most purposes may be in the range of 30–100 to 200–100. After the precipitant is added to said solution, the mass is stirred whereupon the blown oil-styrene combination, which is of a copolymeric nature and probably a copolymer, is thrown out as a sludgy mass which is separated from the liquid portion thereof and then washed with more of said precipitant.

The washed blown oil-styrene combinations so produced may contain between 1%–40% of combined styrene by weight based on the weight of the blown oil combined therewith. At room temperature, these combinations are usually clear viscous liquids or solids depending upon the combined styrene content. When an open dish of one of these liquid combinations is maintained at 80° C.–150° C. in an oven, the surface of said liquid combination films or skins over. These liquid combinations have air drying properties as well so that they may be employed as coating materials on fabrics, paper, metal, wood, etc. They have good adhesion characteristics when applied as films and dried on said bases and have the further desirable property that they may be creased sharply without rupturing. They may be dissolved in suitable low boiling point solvents, such as those derived from coal tar or petroleum and may be applied as a solution film which may be exposed to the air or baked to evaporate off the solvent and dry the combination on said bases.

When desired, said blown oil-styrene combinations produced in the manner aforedescribed may be further treated. They may be dissolved in monomeric styrene, with the ratio by weight of the blown oil-styrene combination to the monomeric styrene being preferably in the range of 100–5 to 100–50. The solution may be heated at 80° C.–145° C. until its viscosity has increased to at least about 27 poises (Gardner method), and may be discontinued at any stage thereafter while the mass is still soluble in a solvent such as xylol, toluol, benzol or the like or it may not be stopped until the product has been converted to the solid infusible state.

When the heating is discontinued after the viscosity of the solution has increased to at least said 27 poises and the product is still in the soluble form, it may be dissolved in one of the aforementioned solvents and this solution may be used to coat and/or impregnate any desirable base, such as paper, wood, metal, fabric etc. Then the so-treated base may be air dried or baked to provide a flexible, crease resistant coating having good electrical insulating characteristics.

In the art of treating electrical coils, it has been customary heretofore to dip the electrical coils in a varnish containing about 50% of volatile solvent. After dipping in the varnish and removing therefrom, the coated coils are baked to evaporate off the solvent and to thermoset the solids remaining in the coil. This procedure has a signal disadvantage inherent therein, and that is the coating in said coil has a number of voids therein which materially reduce the moistureproofness thereof and also its thermal conductivity.

Another method heretofore employed for that purpose was to vacuum impregnate the coil with a varnish containing very little if any thinner but which varnish was rendered fluid by the application of heat. This method also was found objectionable because it is difficult to obtain the requisite degree of fluidity without having the varnish run off of the coils during the subsequent baking operation.

All of the disadvantages inherent in these old processes may be obviated by placing in a mold the electrical coil to be treated. Then into said mold is poured a solution of said blown oil-styrene combination in monomeric styrene. The mold together with its contents is baked to convert said solution to a solid infusible mass. The temperature employed may be in the range of 80° C.–145° C. The resultant infusible mass in and around said coil is a tough, transparent solid having good impact strength. When baked for 16 hours in a closed mold, it has a power factor of 2% at 100° C. and 60 cycles. Said solutions of combined blown oil-styrene in monomeric styrene may be applied directly onto a fabric, metal, wood, paper, etc., base and then baked thereon to provide flexible, tough, transparent coatings of good electrical insulating characteristics. When the base itself has insulating properties, the impregnated and baked product may serve as insulating materials either in tape or sheet form.

The following is a specific example of the method for making one of the products of this invention and is set forth in an illustrative and not a limiting sense and all parts are given by weight.

Into 40 parts of heptane in a vessel are dissolved 30 parts of monomeric styrene and 30 parts of blown linseed oil whose viscosity at 25° C. was 27 poises (Gardner method). The solution was brought to boiling and maintained in this state of boiling under a reflux condenser for about 1½ hours. Then the external source of heat was removed and the mass was allowed to cool to about room temperature. Then to said mass in said vessel was added 120 parts of methanol which was stirred therein for about ¼ hour whereupon a sludgy mass consisting essentially of blown linseed oil-styrene combination precipitated out. Stirring was discontinued and the sludgy mass dropped to the bottom of the vessel. The liquid above the precipitate was decanted and the sludgy mass was washed twice with methanol. The precipitate or sludgy mass was then heated at 125° C. until clear and was allowed to cool to room temperature. This clear precipitate may be used in the manner heretofore set forth or it may be further treated as follows:

70 parts of said precipitate is dissolved in 30 parts of monomeric styrene. This solution may be poured into a mold containing an electrical coil. The mold is then closed and baked for 16–24 hours at 125°C.–135° C. to convert said solution to the solid infusible state as a substantially infusible transparent coating-impregnant.

Having thus described my invention, what I claim and desire to protect by Letters Patent is:

1. The method comprising copolymerizing blown unsaturated fatty oil and styrene by heating a solution of a blown unsaturated fatty oil and monomeric styrene in a solvent, the ratio by weight of the monomeric styrene to the blown oil in said solution being in the range of 50–100 to 300–100, and the viscosity of said blown oil at 25° C. being in the range of 10–300 poises, then precipitating out the copolymerized blown oil-styrene product from said mass, removing said precipitate and then dissolving it in monomeric styrene.

2. The method comprising copolymerizing blown unsaturated fatty oil and styrene by heating a solution of a blown unsaturated fatty oil and monomeric styrene in a solvent, the ratio by weight of the monomeric styrene to the blown oil in said solution being in the range of 50–100 to 300–100, and the viscosity of said blown oil at 25° C. being in the range of 10–300 poises, then precipitating out the copolymerized blown oil-styrene product from said mass, removing said precipitate and then dissolving it in monomeric styrene and heating said solution.

3. The method comprising copolymerizing blown unsaturated fatty oil and styrene by heating a solution of a blown unsaturated fatty oil and monomeric styrene in a solvent, the ratio by weight of the monomeric styrene to the blown oil in said solution being in the range of 50–100 to 300–100, and the viscosity of said blown oil at 25° C. being in the range of 10–300 poises, then precipitating out the copolymerized blown unsaturated fatty oil-styrene product from said mass, removing said precipitate and then dissolving it in monomeric styrene and heat converting said solution to the solid state.

4. The method comprising copolymerizing blown unsaturated fatty oil and styrene by heating a solution of a blown unsaturated fatty oil and monomeric styrene in a hydrocarbon solvent, the ratio by weight of the monomeric styrene to the blown oil in said solution being in the range of 50–100 to 300–100, and the viscosity of said blown oil at 25° C being in the range of 10–300 poises, then precipitating the copylmerized blown oil-styrene product from said mass and dissolving said precipitate in monomeric styrene.

5. The method comprising copolymerizing blown unsaturated fatty oil and styrene by heating a solution of a blown unsaturated fatty oil and monomeric styrene in a solvent, the ratio by weight of the monomeric styrene to the blown oil in said solution being in the range of 50–100 to 300–100, and the viscosity of said blown oil at 25° C. being in the range of 10–300 poises, and adding a lower aliphatic alcohol to said mass to throw out a precipitate and removing said precipitate therefrom, dissolving said precipitate in monomeric styrene and heating said solution until its viscosity has appreciably increased.

6. The method comprising copolymerizing blown unsaturated fatty oil and styrene by heating a solution of a blown oil and monomeric styrene in a solvent, the ratio by weight of the monomeric styrene to the blown oil in said solution being in the range of 50–100 to 300–100, and the viscosity of said blown oil at 25° C. being in the range of 10–300 poises, and adding a lower aliphatic alcohol to said mass to throw out a precipitate, dissolving said precipitate in monomeric styrene and heating said solution to the solid state.

7. A product produced according to claim 3.

ROLAND W. NYE.

REFERENCES CITED

The following references are of record in the file of this patent:

UNITED STATES PATENTS

| Number | Name | Date |
|---|---|---|
| 1,975,959 | Lawson et al. | Oct. 9, 1934 |
| 2,256,160 | Britton et al. | Sept. 16, 1941 |
| 2,382,213 | Dunlap | Aug. 14, 1945 |

FOREIGN PATENTS

| Number | Country | Date |
|---|---|---|
| 392,924 | Great Britain | May 15, 1933 |

OTHER REFERENCES

Hewitt et al., Journal Oil and Colour Chemists' Association, No. 312, vol. XXIX, June 1946, pp. 109–128.